(12) United States Patent
Fukashiro et al.

(10) Patent No.: US 6,362,905 B1
(45) Date of Patent: Mar. 26, 2002

(54) OPTICAL CROSSCONNECT APPARATUS AND OPTICAL TRANSMISSION SYSTEM

(75) Inventors: Yasuyuki Fukashiro, Yokohama; Yukio Hayashi, Fujisawa; Shigeki Kitajima; Tatsuo Kanetake, both of Kawasaki; Masahiro Takatori, Yokohama, all of (JP); Shoichi Hanatani, Richardson; Hirohisa Sano, Dallas, both of TX (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/106,903

(22) Filed: Jun. 30, 1998

Related U.S. Application Data

(63) Continuation-in-part of application No. 09/025,854, filed on Feb. 19, 1998.

(30) Foreign Application Priority Data

Feb. 24, 1997 (JP) .............................................. 9-039238
Jul. 3, 1997 (JP) .............................................. 9-178340
Jul. 14, 1997 (JP) .............................................. 9-187966

(51) Int. Cl.$^7$ ............................................... H04J 14/02
(52) U.S. Cl. ..................... 359/128; 359/117; 359/110
(58) Field of Search .............................. 359/117, 128, 359/176, 110; 385/17

(56) References Cited

U.S. PATENT DOCUMENTS 5,751,868 A * 5/1998 Bala et al. ..................... 385/16
5,754,320 A * 5/1998 Watanabe et al. ........... 359/117
5,774,245 A * 6/1998 Baker ......................... 359/128
6,192,172 B1 * 2/2001 Fatehi et al. .................. 385/17

OTHER PUBLICATIONS

Japanese Electronic Telecommunication Society Conference, 1996, B–1070, pp 555 "Supervising of Optical Paths utilizing Pilot Toues in Optical Path Transport Network" by Y. Hamazumi, et al.

Japanese Electronic Telecommunication Communication Institute, Autumn Conference, 1993, SB–8–1, 4–371, 4–372 "A Novel Optical Cross–connect system for Hitless Optical Network Reconfiguration" by T. Shiragaki, et al.

Japanese Electronic Telecommunication Institute Communication Society Conference, 1996, B–1083, "Characteristics of low insertion loss optical cross connect system for large capacity transmissions", by S. Kitajima, et al.

* cited by examiner

Primary Examiner—Kinfe-Michael Negash
(74) Attorney, Agent, or Firm—Antonelli, Terry, Stout & Kraus, LLP

(57) ABSTRACT

An optical crossconnect apparatus which includes one terminal connected to a transmission path from one optical transmission terminal station and another terminal connected to a transmission path from another optical transmission terminal station, a first optical signal switch having "M1" ports and "N1" ports, through which the optical signal can pass, a second optical signal switch having "M2" ports and "N2" ports, through which the optical signal can pass, and "L" optical signal repeaters, one end connected to the "N1" ports of the first optical signal switch, and the other end connected to the "N2" ports of the second optical switch. The "N1" and the "N2" ports are equal to "L" optical signal repeaters. The "M1" ports of the first optical signal switch connected to the one terminal, and the "M2" ports of the second optical signal switch connected to the other terminal are larger than, or equal to 2.

8 Claims, 12 Drawing Sheets

OPTICAL CROSSCONNECT APPARATUS AND OPTICAL TRANSMISSION SYSTEM

CROSS-REFERENCE TO RELATED APPLICATIONS

This application is a continuation-in-part of copending U.S. patent application Ser. No. 09/025,854, filed Feb. 19, 1998 entitled "OPTICAL TRANSMISSION LINE TROUBLE RECOVERY METHOD AND NODE APPARATUS" by S. Kitajima et al., the disclosure of which is incorporated herein by reference.

This application relates to (1) U.S. patent application Ser. No. 09/022,004 filed Feb. 11, 1998 entitled "FAULT RESTORATION CONTROL METHOD AND IT'S APPARATUS IN A COMMUNICATION NETWORK" by Y. Sawada et al. and (2) U.S. patent application Ser. No. 09/025,331, filed Feb. 18, 1998 entitled "OPTICAL TRANSMISSION APPARATUS AND OPTICAL SYSTEMS" by H. Tsushima et al., the disclosure of which are incorporated herein by reference.

BACKGROUND OF THE INVENTION

The present invention generally relates to an optical crossconnect apparatus for switching an optical transmission path, and also to an optical transmission system. More specifically, the present invention is directed to an optical crossconnect apparatus capable of recovering a failure of an optical transmission system under economical good connection, and also to an optical network.

Very recently, information infrastructures are prepared and maintained in order to widely progress a so-called "multimedia" typically known as the Internet and CATV in society. To establish highly advanced information social structures, presently available information transmission amounts per one user are considerably increased. To this end, optical fiber networks capable of achieving wide ranges/low loss transmissions are introduced in transport backbones capable of performing long-hand/high-capacity transmissions. In a certain trunk line system constructed of optical fiber network, 10-Gbit data per second may be transmitted in unit of 1 optical fiber. As a result, failures, or troubles occurred in transmission paths, or lines would give serious adverse influences to society, and it is, therefore, very important to maintain the qualities of the network services even when failures happen to occur in transmission paths.

In order that reliability of networks is increased, transmission paths are effectively utilized, and also maintenance operation of transmission path is improved when failures happen to occur, optical crossconnect apparatuses have been positively developed. An optical crossconnect apparatus is installed between optical transmitters/receivers and optical fibers functioning as transmission paths within 1 node of an optical fiber network, and this optical crossconnect apparatus switches optical transmission paths to which optical input/output signals of the optical transmitter/receiver. With employment of such a function, for instance, in the case that a failure happens to occur in a certain working fiber, two sets of optical crossconnect apparatuses provided on both ends of this working fiber switch the connection destination of the optical transmitter/receiver to a protection fiber, so that the failure occurred in the transmission path can be restored.

On the other hand, in an actual optical network, a sufficient amount of protection fibers are not always installed among all of nodes. Accordingly, when a transmission path is recovered from a failure, while using the protection fiber installed between the nodes provided at both ends of the optical fiber where the failure happens to occur, and a third node, an optical signal must be rerouted to another route where no failure occurs so as to recover the failure-occurred transmission path. To reroute an optical signal, the transmission length would be extended, and the optical crossconnect apparatus itself of this third node would have loss. To avoid such an insertion loss, an optical signal repeating function is necessarily required for this optical crossconnect apparatus. This repeating function can be realized by that an optical repeater such as an optical amplifier and a regenerator is built in this optical crossconnect apparatus.

As the optical crossconnect apparatus having such an arrangement, for instance, one optical crossconnect apparatus is described in Japanese Electronic Telecommunication Institute Communication Society Conference held in 1996, publication B-1070, on page 555. Another optical crossconnect apparatus having no optical signal repeating function is described in Japanese Electronic Telecommunication Institute Communication Society Conference held in 1996, publication B-1083, on page 568.

Furthermore, the optical crossconnect technique is disclosed in Japanese Electronic Telecommunication Communication Institute, Autumn Conference held in 1993 publication SB-8-1, 4-371, on page 372.

SUMMARY OF THE INVENTION

An object of the present invention is to provide an optical crossconnect apparatus capable of effectively using protection fibers and optical repeaters, and further to provide an optical transmission system capable of recovering failure-occurred transmission paths in low cost.

Another object of the present invention is to provide such an optical crossconnect apparatus capable of monitoring optical signal penetrating conditions within an optical signal path of this optical crossconnect apparatus, and also capable of effectively identifying a place where a failure happens to occur when this failure occurs.

A further object of the present invention is to provide an optical crossconnect apparatus capable of executing a self-fail diagnosis of such an optical switch unit having occurrence probability of a failure among optical switch units for switching two sets of working transmission path and protection transmission path, and further capable of shortening failure restoration time.

A still further object of the present invention is to provide such an optical transmission system capable of confirming operation reliability/failure restoration related to a switched-destination, or a switched-back optical transmission path, and further to an optical switch units employed in the above-described optical crossconnect apparatus.

An optical crossconnect apparatus, according to a first aspect of the present invention, is featured by that an optical input unit is connected to an input of an optical signal repeater by an optical signal switching unit, and also an output of this optical signal repeater is connected to an optical output unit by an optical signal switching unit in such a manner that a protection fiber is connected to the optical signal repeater in a flexible manner. As a result, when the optical crossconnect apparatus equipped with the optical signal repeater mutually connects the protection fibers, since this optical crossconnect apparatus owns the optical signal switching unit capable of selecting such a protection fiber connected to the optical signal repeater, no longer the optical signal repeaters are prepared for the respective protection fibers. Thus, the optical crossconnect apparatus can be manufactured in low cost. Also, since the optical crossconnect apparatus employs the optical signal switching unit capable of selecting the optical signal repeater connected to the protection fiber, even when a failure happens to occur in the optical signal repeater, the optical transmission path can be immediately switched to the optical signal repeater operated under normal condition. As a result, the optical crossconnect apparatus having high reliability can be realized.

An optical crossconnect apparatus for switching transmission paths of an optical transmission signal by employing an optical switch unit, according to a second aspect of the present invention, is featured by comprising: an optical signal monitoring unit provided between an optical transmission signal input unit and the optical switch unit; either a signal source built therein or an external signal source; and a unit for sending out a monitoring optical signal supplied from, for example, a protection transmitter unit of an optical transmission terminal station apparatus.

An optical crossconnect apparatus for switching transmission paths of an optical transmission signal by employing an optical switch unit, according to a third aspect of the present invention, is featured by comprising: an optical signal monitoring unit provided between an optical transmission signal input unit and the optical switch unit; and an optical signal monitoring unit provided between the optical switch unit and an optical transmission signal output unit. This optical crossconnect apparatus can have such a function that a condition of an optical transmission signal of an input unit of this optical switch unit is compared with a condition of an optical transmission signal of an output unit of this optical switch unit by employing output signals derived from these two optical signal monitoring units, so that a failure of the optical switch unit is diagnosed.

Also, the optical crossconnect apparatus is further comprised of a first optical switch unit and a second optical switch unit, and also two sets of working optical switch unit and protection optical switch unit. The first optical switch unit selects the optical transmission signal, or the monitoring optical signal, which is entered into two sets of optical switch units. The second optical switch unit selects as to whether the output signal from each of the two optical switch units is directed to an optical transmission line, or an optical signal monitoring unit. The optical crossconnect apparatus can have such functions that this optical crossconnect apparatus confirms that the optical switch unit is operated under normal condition, and also identifies a place when a failure happens to occur, while using the monitoring optical signal and the output from the optical signal monitoring unit.

The optical crossconnect apparatus can further have such functions that this optical crossconnect apparatus confirms that the protection optical transmission path is set under normal state during the normal operation, and also confirms that the working optical transmission path is recovered from the failure during the failure occurrence condition, while the monitoring optical signal is sent to the protection optical transmission path during the normal operation, the monitoring optical signal is sent to the working optical transmission path during the failure occurrence condition.

With employment of the above-described arrangement, the optical crossconnect apparatus can monitor the penetration condition of the optical signal in the signal path of the optical crossconnect apparatus, and further can effectively identify the failure occurrence place when the failure happens to occur. Also, since the monitoring optical signal source is employed, such an optical switch unit that a failure may occur can be self-diagnosed within two sets of the working/protection optical transmission paths switching switch units. Thus, the failure restoration time may be reduced.

Furthermore, in accordance with the present invention, the conditions within the optical crossconnect apparatus, or the conditions of the optical transmission path can be monitored by employing the monitoring optical signal. The operation reliability and the failure restoration as to the switched destination optical transmission path, or the switched back optical transmission path, and further the optical switch units employed in the optical crossconnect apparatus can be confirmed.

An optical transmission system, according to a fourth aspect of the present invention, is featured by comprising a plurality of optical crossconnect apparatuses, and an optical transmission path for connecting the respective optical crossconnect apparatuses. The plural optical crossconnect apparatuses contain a plurality of optical transmitters/receivers, a first optical signal switching unit and a second signal switching unit, which are connected to the respective optical transmitters/receivers, and own ports through which optical signal can pass. The optical crossconnect apparatuses further contain an optical signal repeater, one terminal of which is connected to the port of the first optical signal switching unit, and the other terminal of which is connected to the port of the second optical signal switching unit. As a result, the optical transmitters/receivers communicate the optical transmission signal through the optical transmission paths except for an optical transmission path where a failure happens to occur, depending upon the occurrence of the failure. As a consequence, since the optical crossconnect apparatus according to the present invention is employed, a total number of optical signal repeaters employed in the overall optical transmission system can be reduced, and the optical signal repeaters can be quickly restored from the failure. Furthermore, since the protection optical fiber can be effectively utilized, the optical transmission system with high reliability can be manufactured in low cost.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, various embodiments of the present invention will be described in detail.

Figure 1:
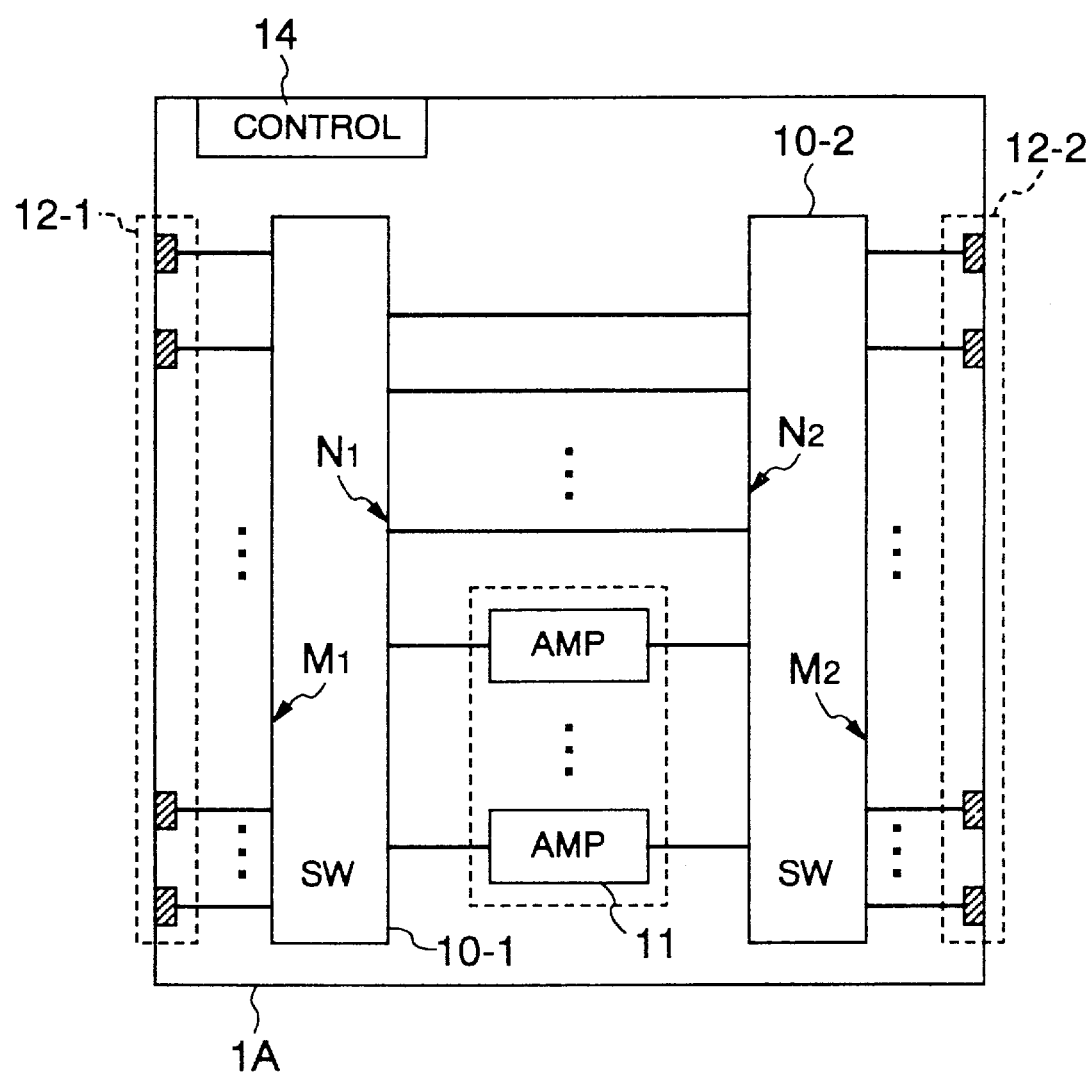
FIG. 1 is a schematic block diagram for representing an optical crossconnect apparatus according to an embodiment of the present invention.

FIG. 1 schematically shows an optical crossconnect apparatus according to an embodiment of the present invention. In FIG. 1, an optical crossconnect apparatus 1A is arranged by optical switch units 10-1 and 10-2; optical signal input/output units 12-1 and 12-2; and also at least one optical amplifier 11. An input of the optical switch unit 10-1 is connected to the optical input/output unit 12-1, and an output of the optical switch unit 10-1 is connected to either an input of the optical switch unit 10-2 or an input of the optical amplifier 11. An output of the optical amplifier 11 is connected to another input of the optical switch unit 10-2 which is not connected to the output of the optical switch unit 10-1, and an output of the optical switch unit 10-2 is connected to the optical input/output unit 12-2. A monitor/control unit 14 monitors the optical switch units 10-1, 10-2, and the optical amplifier 11, and controls these elements.

It should be noted that the optical switch unit 10-1 owns M1 pieces of ports so as to be connected to the optical input/output unit 12-1, and further owns N1 pieces of ports in order to be connected to the optical amplifier 11 and the optical switch unit 10-2. Similarly, the optical switch unit 10-2 owns M2 pieces of ports so as to be connected to the optical input/output unit 12-2, and further owns N2 pieces of ports in order to be connected to the optical amplifier 11 and the optical switch unit 10-1.

Figure 2:
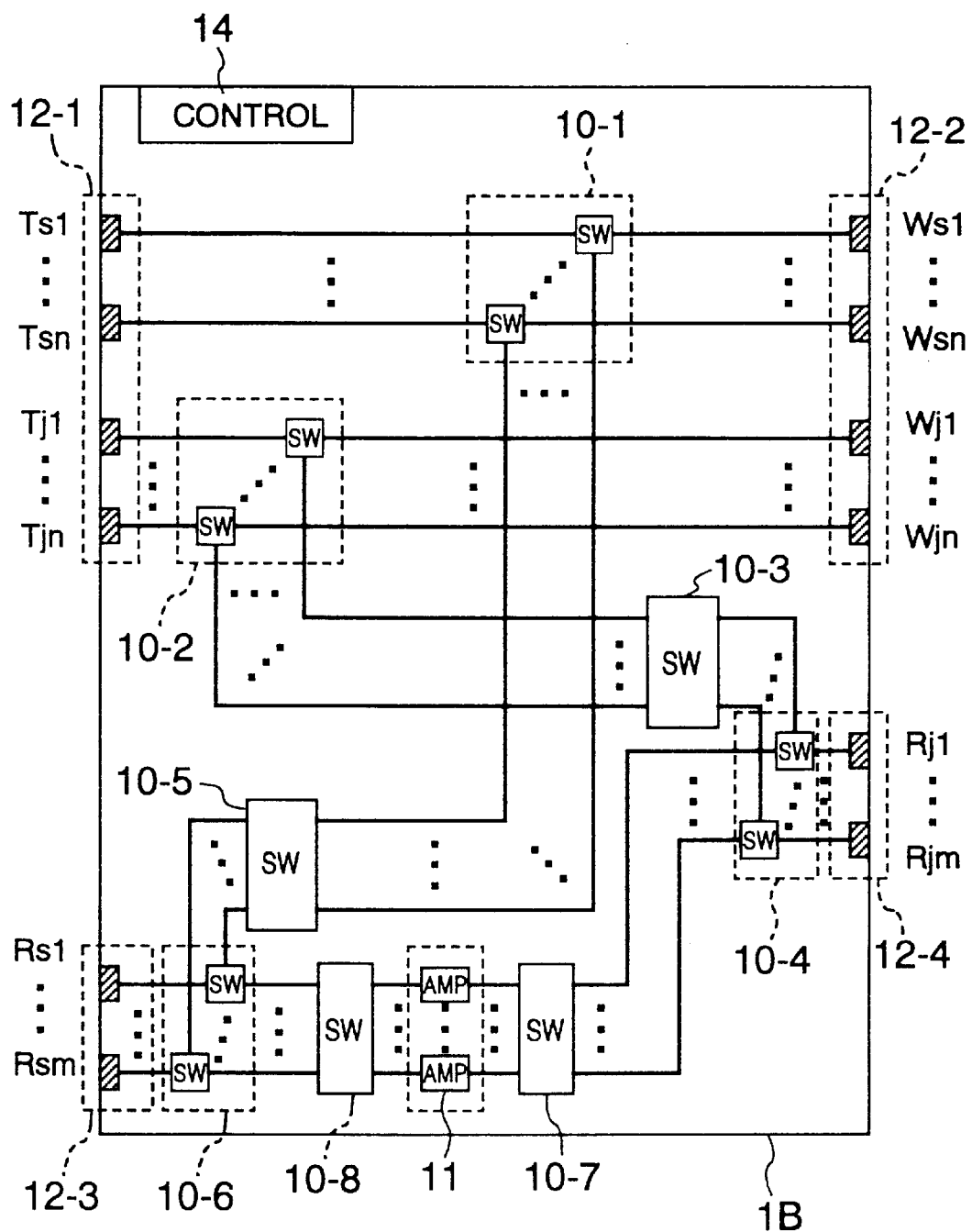
FIG. 2 is a schematic block diagram for indicating an optical crossconnect apparatus according to another embodiment of the present invention.

FIG. 2 schematically indicates an optical crossconnect apparatus according to another embodiment of the present invention. In FIG. 2, an optical crossconnect apparatus 1B is arranged by optical input units (12-1)Ts1 to Tsn connected to an optical transmitter; optical output units (12-1)TJ1 to Tjn connected to an optical receiver; and optical output units (12-2)Ws1 to Wsn and also optical input units (12-2)WJ1 to Wjn, which are connected to a working optical fiber. This optical crossconnect apparatus 1B is further arranged by optical output units (12-3)Rs1 to Rsm and optical input units (12-4)Rj1 to Rjm, which are connected to a protection optical fiber; an optical switch unit 10-1 having "n" pieces of inputs and "2n" pieces of outputs; an optical switch unit 10-2 having "2n" pieces of inputs and "n" pieces of outputs; an optical unit 10-3 having "m" pieces of inputs and "n" pieces of outputs; an optical unit 10-4 having "m" pieces of inputs and "2m" pieces of outputs. This optical crossconnect apparatus 1B is further arranged by an optical switch unit 10-5 having "n" pieces of inputs and "m" pieces of outputs; an optical switch unit 10-6 having "2m" pieces of inputs and "m" pieces of outputs; an optical unit 10-7 having "m" pieces of inputs and "k" pieces of outputs; an optical unit 10-8 having "k" pieces of inputs and "m" pieces of outputs; and "k" pieces of optical amplifiers 11; and further a controller unit 14 for supervising/controlling the units and the optical units inside/outside the optical crossconnect apparatus. Such an optical crossconnect apparatuses 1A, 1B may be used in the bidirectional transmission.

First, a description will now be made of a basic operation of the optical crossconnect apparatus 1B shown in the drawing. Normally, the optical switch unit 10-1 connects "n" pieces of optical signals originated from the optical transmitter, which are entered from the optical input units Ts1 to Tsn, to the optical output units Ws1 to Wsn, respectively. To the contrary, when the controller 14 detects a failure of an optical fiber connected to, for example, the optical output unit Ws1, the optical switch unit 10-1 switches the optical signal supplied from the optical input unit Ts1 to the optical switch unit 10-5 in response to a control signal supplied from the controller 14. The optical switch unit 10-6 selects any one of the optical signals outputted from the optical switch unit 10-5 and the optical switch unit 10-8, and connects the selected optical signal to the respective optical output units Rs1 to Rsm. Both the optical switch units 10-5 and 10-6 output the optical signal derived from the optical switch unit 10-1 to one of the optical output units Rs1 to Rsm connected to such an optical fiber, the normality of which is confirmed, in response to the control signal issued from the controller 14.

Next, a description will now be made of an operation of the optical crossconnect apparatus 1B in such a case that the optical crossconnect apparatus 1B is located on a restoration route used to recover a failure, and both the optical fiber connected to the optical input unit Rj1 and the optical fiber connected to the optical input unit Rsm are selected as the failure-restoring reroute. The optical switch unit 104 outputs an optical signal entered from the optical input unit Rj1 to the optical switch unit 10-7. This optical switch unit 10-7 enters the optical signal to such an optical amplifier among "k" pieces of optical amplifiers 11, which is recognized as normal condition, and can be connected. The optical signals which have been amplified up to an optical power is outputted from the optical switch units 10-8 and 10-6 to the optical output unit Rsm. It should be understood that the controller 14 is well known in this field, and may be realized by employing not such a specific unit arrangement for selecting the optical fiber, but the known unit arrangement.

In this case, since the optical amplifier is connected via the optical switch units 10-7, 10-8, and the like to the protection optical fiber, the total number "k" of the optical amplifiers need not be equal to a total number of the optical input units Rj1 to Rjm of the optical crossconnect apparatus 1B, or a total number of the protection optical fibers connected to the optical input units Rj1 to Rjm. As a consequence, it is possible to design such an optical crossconnect apparatus having higher flexibility, taking account of the cost as well as the reliability of the overall optical transmission system.

Figure 3:
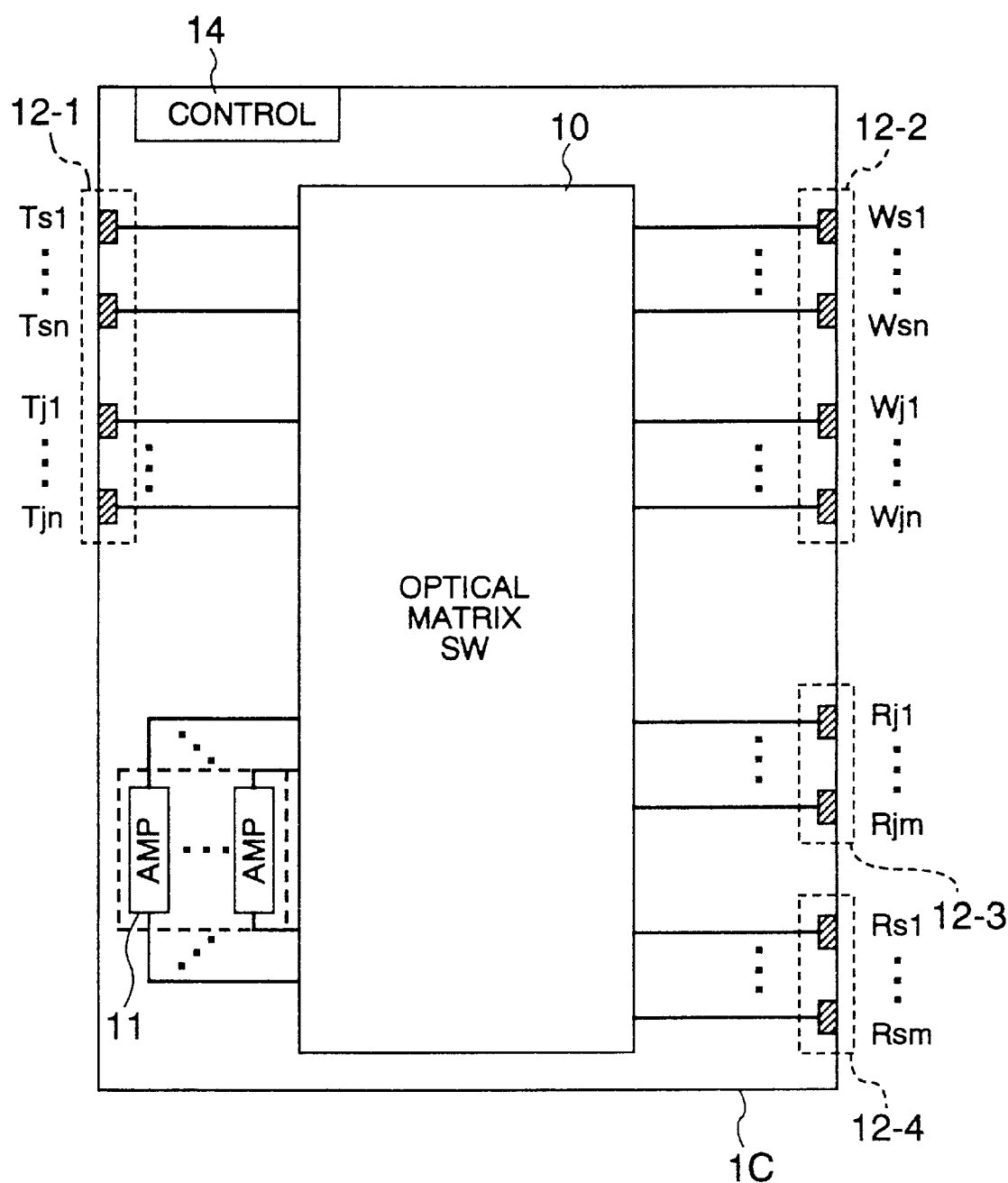
FIG. 3 is a schematic block diagram for showing an optical crossconnect apparatus according to another embodiment of the present invention.

FIG. 3 schematically indicates an optical crossconnect apparatus 1C according to another embodiment of the present invention. This optical crossconnect apparatus is featured by replacing the optical switch units 10-1 to 10-8 employed in the arrangement of the previous embodiment shown in FIG. 2 by a single optical matrix switch 10. In accordance with this embodiment, both the optical input/ output unit 12-1 and the optical input/output unit 12-2 can be connected to each other in a more flexible manner.

Figure 4:
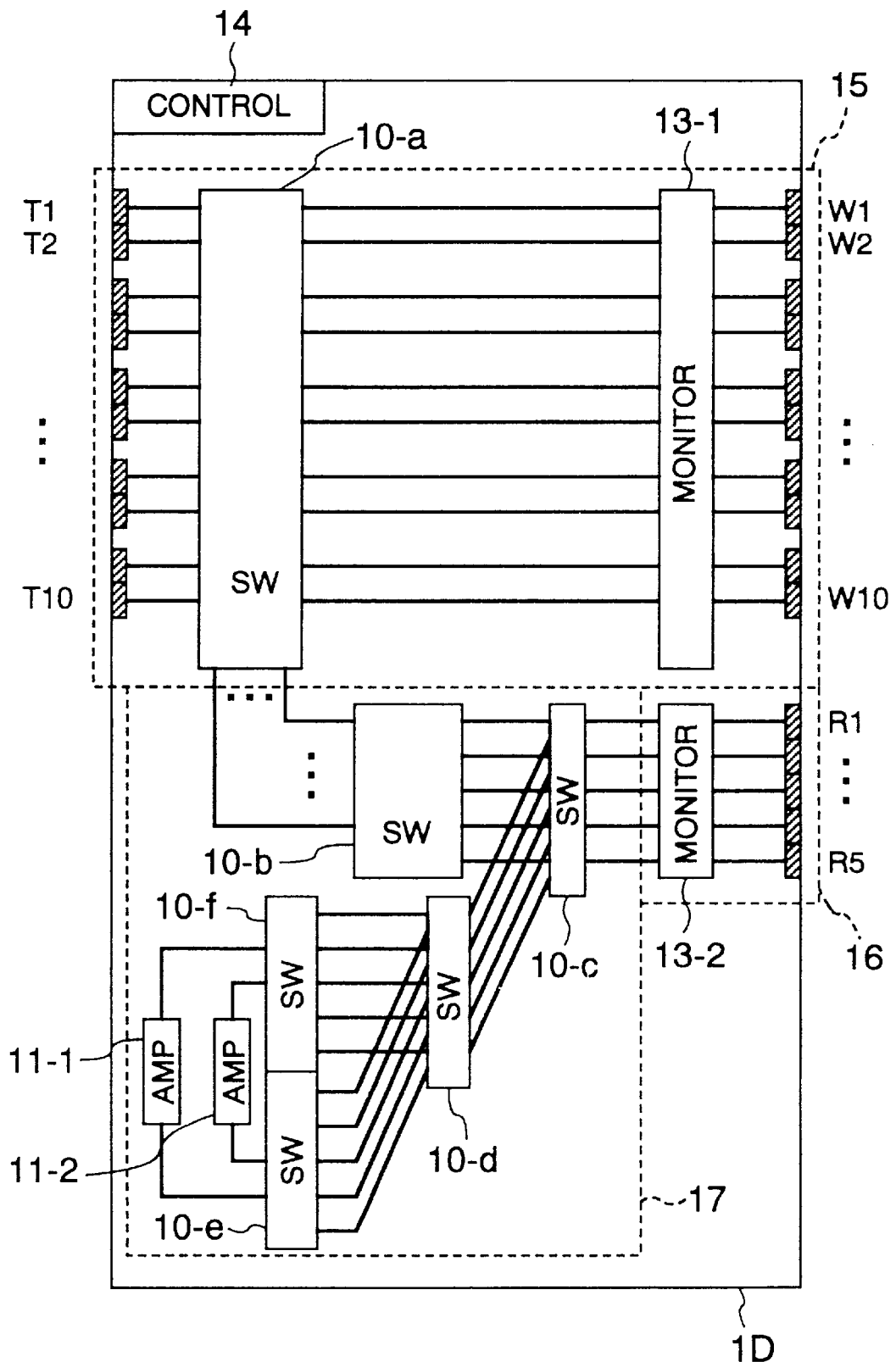
FIG. 4 is a schematic block diagram for representing an optical crossconnect apparatus according to another embodiment of the present invention.

Furthermore, as another embodiment of the present invention, in FIG. 4, there is shown a structural example of an optical crossconnect apparatus 1D applicable to such an optical transmission system capable of performing a bidirectional transmission by way of a single fiber. In FIG. 4, an optical crossconnect apparatus 1 is constituted by optical input/output units T1 to T10 and W1 to W10; an optical switch unit 10-*a*; a working interface 15 containing an optical monitor unit 13-1; and a protection interface 16 containing optical input/output units R1 to R5 and an optical monitor unit 13-2. This optical crossconnect apparatus is further constructed of optical switch units 17 containing optical switch units 10-*b* to 10-*f* and an optical amplifier 11; and a controller 14.

In the optical crossconnect apparatus 1D indicated in FIG. 4, the optical switch units 10-*a* to 10-*c* are controlled by the controller 14, so that the optical input/output units T1 to T10 may be connected to either the optical input/output units W1 to W10 or the optical input/output units R1 to R5, respectively. Also, the optical switch units 10-*c* to 10-*f* are controlled by the controller 14, so that the optical input/output units R1 to R5 may be mutually connected to each other in an arbitrary connecting manner. For example, an optical signal inputted into the optical input/output unit R1 may be outputted to the optical input/output unit R5 by controlling the optical switch units 10-*c*, 10-*d*, 10-*e*, and 10-*f*. In this case, even when the optical signal inputted from any one of the optical input/output units R1 to R5 by the optical switch unit 10-*d*, the optical signal can be continuously conducted to the input sides of the optical amplifiers 11-1 and 11-2. Furthermore, any one of the optical input/output units R1 to R5 which will be connected to the optical amplifiers 11-1 and 11-2 can be arbitrarily selected by the optical switch units 10-*e* and 10-*f*. In other words, since two sets of optical amplifiers 11-1 and 11-2 can be commonly used by 5 sets of protection optical fibers connected to the optical input/output units R1 to R5, a total number of optical amplifiers can be reduced.

In this embodiment, a total number of the above-described optical input/output of the optical crossconnect apparatus 1D is 25. In an actual case, this quantity may be determined based upon the system scale, a total number of installed fibers, and the survivability. Also, a total number of the optical amplifiers is 2 in this embodiment. Alternatively, this quantity of the optical amplifiers may be arbitrarily set, depending upon the required economical aspect and the survivability. Furthermore, in the case that a total number of optical amplifiers is set to be any number larger than ½ number of the optical input/output of the protection interface 16, since at least one optical amplifier is allocated to a pair of optical input and optical output, this optical crossconnect apparatus may be quickly restored from the malfunction of any one of the optical amplifiers connected to the optical switch units 10-*e* and 10-*f*, and also the failure of the protection optical transmission path.

Alternatively, in order to accept such a restoration route without requiring an optical signal repeating operation, several optical amplifiers among the optical amplifiers connected to the optical switch units 10-*e* and 10-*f* may be simply replaced by optical fibers. Also, the optical switch units 10-*b* to 10-*f* employed in this embodiment may be replaced by an optical matrix switch of 14-input and 5-output construction. In this case, assuming now that a total number of working fibers, and a total number of protection fibers, which are connected to an optical crossconnect apparatus, are "W" and "R", respectively, and further a total number of optical amplifiers contained in this apparatus is "K", a size of an optical switch unit which may replace the optical switch units 10-*b* to 10-*f* is (W-2K) pieces of inputs and (R) pieces of outputs in minimum.

Figure 5:
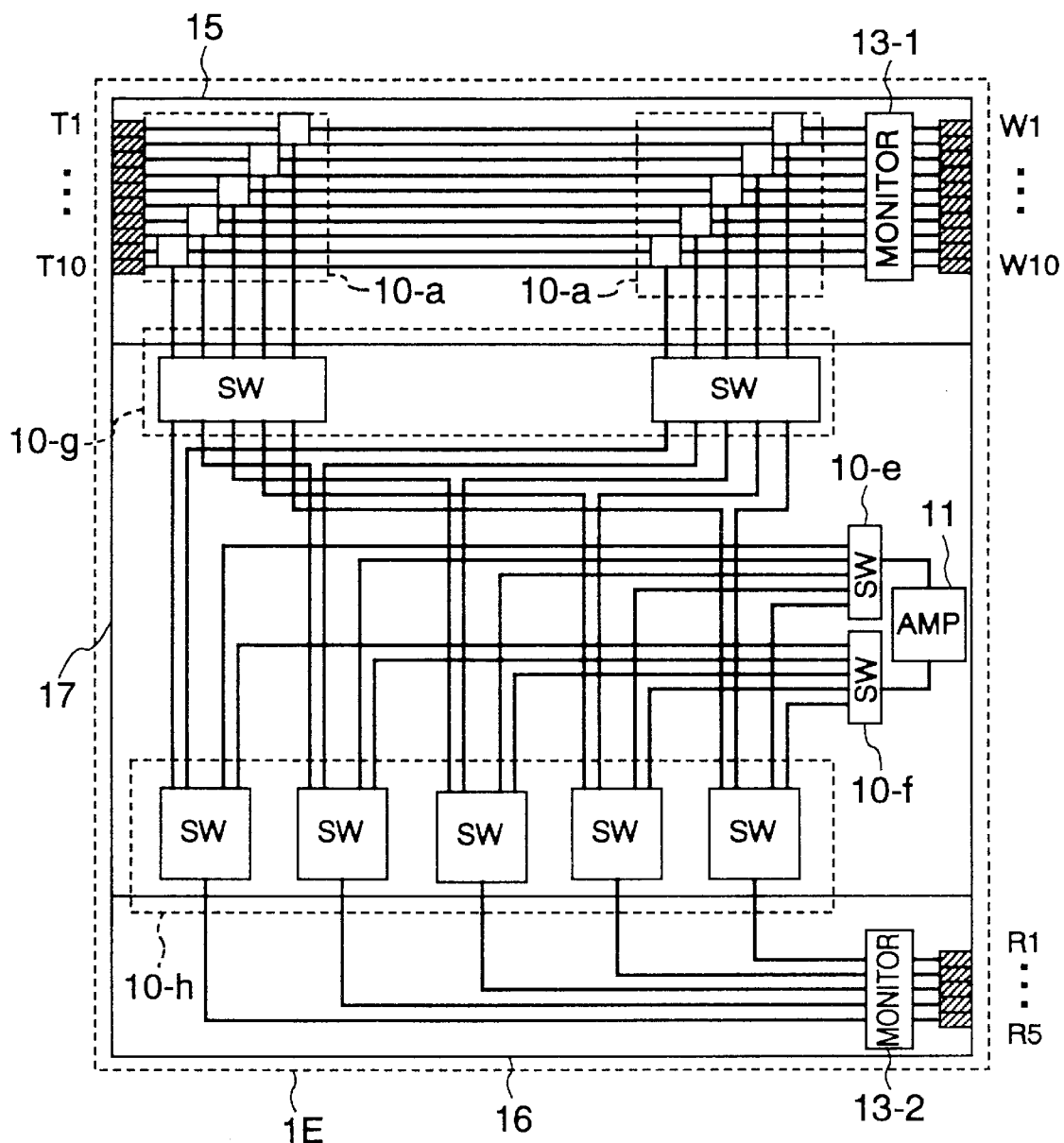
FIG. 5 is a schematic block diagram for indicating an optical crossconnect apparatus according to another embodiment of the present invention.

As another embodiment of the present invention, in FIG. 5, there is shown an arrangement example of the working interface 15, the optical switch unit 17, and the protection interface 16 indicated in FIG. 4.

In the working interface unit 15, a 1-input/2-output optical switch unit is provided between each of the optical input/output units T1 to T10 and each of the optical input/output units W1 to W10. This 1-input/2-output optical switch unit switches that the optical input/output units T1 to T10 are selectively connected to either the optical input/output units W1 to W10 or the optical input/output units R1 to R5. The optical switch unit 17 is constituted by a 5-input/5-output optical switch unit 10-*g*; a 1-input/4-output optical switch unit 10-*h*; 1-input/5-output optical switch units 10-*e* and 10-*f*; and an optical amplifier 11, which entirely constitutes a 10-input/5-output optical switch unit.

In this embodiment, the optical crossconnect apparatus 1E is operated as the 15-input/15-output optical switch unit applicable to the bidirectional transmission. Since only one stage of the 1-input/2-output optical switch unit is employed as the optical switch unit capable of switching the working optical path and the protection optical path between the optical input/output units T1 to T10 and the optical input/output units W1 to W10, the insertion loss of the optical crossconnect apparatus can be greatly reduced, as compared with an optical crossconnect apparatus with employment of an n×m type optical switch matrix. Also, for example, in the case that a total path number of the working optical fibers connected to the optical crossconnect apparatus is "D"; a total number of the working optical fibers per 1 optical path is "A"; a total number of the protection optical fibers per 1 optical path is "R"; and a total number of the built-in optical amplifiers is "K", the optical switch unit 10-*g* is constituted by A pieces of D-input/D-output optical switches, the optical switch unit 10-*h* is constituted by D pieces of (A+2)-input/R-output optical switches, and each of the optical switch units 10-*e* and 10-*f* is constituted by a D-input/K-output optical switch.

Since the above-explained optical crossconnect apparatus owns the switching function of the physical medium, namely "optical fiber", the above-described function can be realized irrespective to the sorts of optical signals transmitted through the medium, namely the encoding method, the modulation method, and the multiplexed wavelength number.

Also, in the above-explained embodiment, the optical amplifier is employed as the repeater for the optical signal. Alternatively, even when the regenerator is employed, a similar effect according to the present invention may be achieved.

As to concrete optical switch units, for example, since the optical switch units 10-1 and 10-2 of FIG. 2 and the optical switch unit 10-*a* of FIG. 4 and FIG. 5 are inserted into the working transmission system, these optical switch units preferably have low insertion loss as low as possible. Such an optical switch unit having low insertion loss is, for instance, a 1-input/2-output scaled optical switch, i.e., fiber-mechanical optical switches or lens-mechanical optical switches capable of realizing insertion loss less than, or equal to 1 dB.

Figure 6:
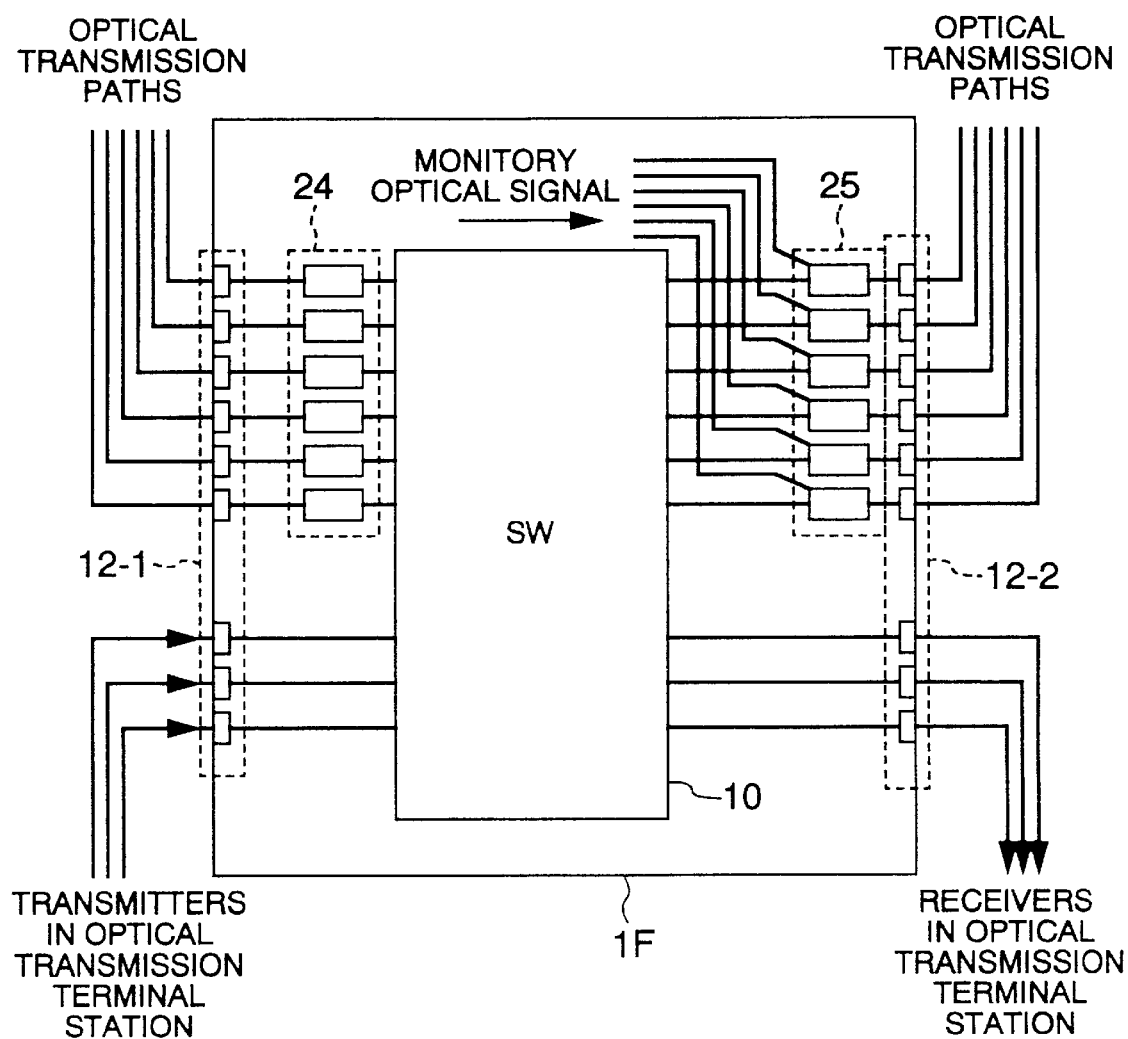
FIG. 6 is a schematic block diagram for showing an optical crossconnect apparatus according to another embodiment of the present invention.

FIG. 6 is a schematic block diagram for indicating an optical crossconnect apparatus 1F according to another embodiment of the present invention. In FIG. 6, reference number 24 shows an optical signal monitoring unit, reference numeral 25 indicates an optical signal inserting unit, reference numeral 10 represents an optical switch unit, and reference numeral 12-1 and 12-2 are optical input/output units.

The optical crossconnect apparatus 1F shown in FIG. 6 is constructed of the optical input/output unit 12-1, an optical switch unit 10, the optical input/output unit 12-2, the optical signal inserting unit 25, and the optical signal monitoring unit 24. Then, in this optical crossconnect apparatus 1F, for instance, since the optical switch unit 10 is controlled, each of optical transmission signals is transmitted via the optical transmission signal output unit 12-2 to one of three transmission paths which are defined as the working optical path among six optical transmission paths (optical fibers). These optical transmission signals are inputted via the optical input/output unit 12-1 from three sets of optical transmitter installed in an optical transmission terminal station apparatus. Similarly, each of the three transmission paths through which the optical transmission signals are transmitted among the six optical transmission paths can be connected to any one of three optical receivers installed in an optical transmission terminal station apparatus. As described above, the optical crossconnect apparatus 1F can be used in the bidirectional transmission since there is no element to limit a transmission direction therein.

In accordance with the arrangement of the optical crossconnect apparatus 1F shown in FIG. 6, when a monitoring optical signal is supplied to the optical signal inserting unit 25, this optical signal inserting unit 25 separates an optical information signal derived from the optical switch unit 10 from the monitoring optical signal, and then sends out these optical signals via optical input/output unit 12-2 to the optical transmission path. The optical crossconnect apparatus on the reception side connected to this optical transmission path may receive either the optical information signal or the monitoring optical signal separated from this optical signal used for information. Then, the optical signal monitoring unit 24 discriminates the optical signal used for information from the monitoring optical signal to monitor a level of this discriminated optical signal, so that a failure occurred in the transmission path can be detected.

Furthermore, when a failure happens to occur in any one of the working optical path, this optical crossconnect apparatus 1F shown in FIG. 6 may switch the optical output destination to any of the three transmission paths which are defined as the protection transmission path among the six optical transmission paths. When the working transmission path where the failure occurs is restored, this optical crossconnect apparatus 1F may switch back the optical transmission signal to the working transmission path.

Then, the optical crossconnect apparatus 1F indicated in FIG. 6 is arranged as follows: As the monitoring optical signal, a built-in type optical signal source, or an external optical signal is used. The optical signal inserting unit 25 for sending this optical signal from one end of the switched optical transmission path, or one end of the switched-back optical transmission path is provided on the output side of the optical switch unit 10. Also, the optical signal monitoring unit 24 for monitoring the optical transmission signal derived from the optical transmission path is provided on the input side of the optical switch unit 10. As a consequence, the optical crossconnect apparatus 1F can monitor the conditions of the optical transmission paths by utilizing the built-in type optical signal source, or the external optical signal as the monitoring optical signal. The above-described built-in type optical signal source can output such an optical signal which can pass through either a linear optical repeater or a regenerator provided in the transmission path.

For a better understanding of the present invention, in the optical crossconnect apparatus 1F of FIG. 6, the optical signal having the information is inputted into the optical signal monitoring unit 24, and furthermore is entered into "M" pieces of ports of the optical switch unit 10. The optical switch unit 10 selects the transmission path, and sends out this optical information signal from "N" pieces of ports of the optical switch unit 10 via the optical signal inserting unit 25 to another transmission path. In addition, the optical signal inserting unit 25 may be alternatively series-connected between the "M" pieces of the ports of the optical switch unit 10 and the optical signal monitoring unit 24. Similarly, the optical signal monitoring unit 24 may be series-connected between the optical signal inserting unit 25 and the optical input/output unit 12-2 on the side of the "N" pieces of ports of the optical switch unit 10.

Furthermore, alternatively, both the optical signal monitoring unit 24 and the optical signal inserting unit 25 may be provided in the optical crossconnect apparatus 1A shown in FIG. 1. Alternatively, a series-unit arrangement of the optical signal monitoring unit 24 and the optical signal inserting unit 25 may be connected between the optical switch units 10-1 and 10-2, and between the optical input/output units 12-1 and 12-2. It should be noted that the optical signal monitoring unit 24 is, for example, constructed of a photodetector and an optical coupler, whereas the optical signal inserting unit 25 is constituted by an optical coupler and an optical switch. The ports owned by the optical switch unit 10 are similar to those of the below-mentioned embodiment.

It should be understood that a total number of the optical transmission paths connected to the optical crossconnect apparatus is 6 on the input side thereof, and a total number of the optical transmission paths connected thereto is 6 on the output side thereof, namely 12 optical transmission paths. However, according to the present invention, a total number of transmission paths connected to this optical crossconnect apparatus is arbitrarily selected, and the effect of the present invention is not limited to this number. Therefore, this total number may be determined by considering the number of transmitters/receivers connected to the optical crossconnect apparatus, a total number of installed fibers, and the required survivability. This may be similarly applied to the below-mentioned embodiments.

Figure 7:
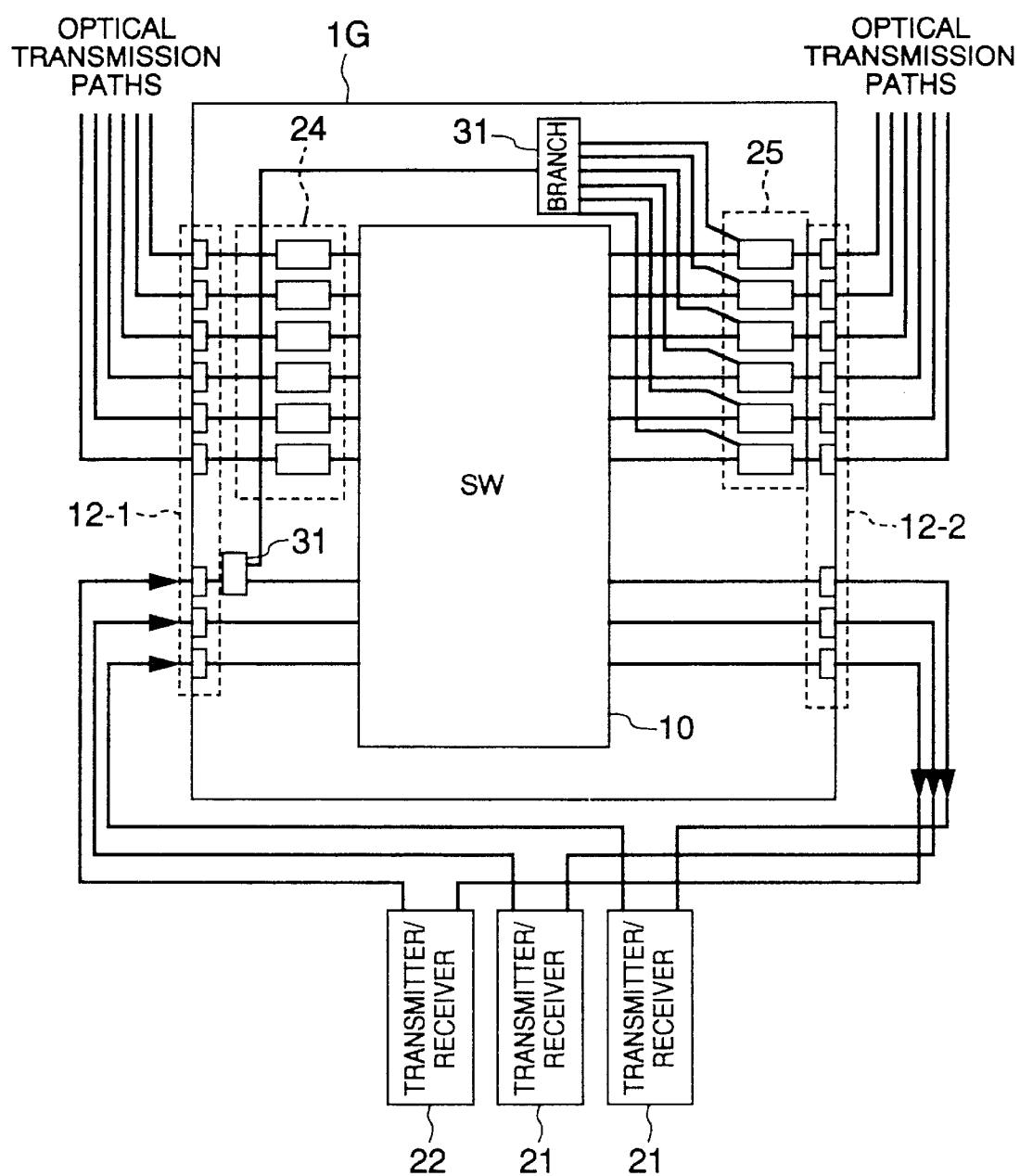
FIG. 7 is a schematic block diagram for representing an optical crossconnect apparatus according to another embodiment of the present invention.

FIG. 7 is a schematic block diagram for indicating a structural example of an optical crossconnect apparatus 1G according to another embodiment of the present invention. In FIG. 7, reference numeral 21 shows working transmitter/receiver, reference numeral 22 shows protection transmitter/receiver, reference numeral 31 represents an optical signal branching unit, and other reference numerals indicate the same unit elements as shown in FIG. 6.

The optical crossconnect apparatus 1G shown in FIG. 7 employs an optical signal supplied from the protection optical transmitter/receiver 22 of the optical transmission, terminal station apparatus as the monitoring signal source employed in the optical crossconnect apparatus 1F indicated in FIG. 6. In other words, in the optical crossconnect apparatus 1G shown in FIG. 7, two sets of the working optical transmitter/receiver 21 are connected to one set of the protection optical transmitter/receiver 22. Also, 6 pieces of optical fibers used to transmit optical transmission signals are connected to the output side, whereas 6 pieces of optical fibers used to transmit optical transmission signals are connected to the input side.

In order that the protection optical transmitter/receiver 22 can be continuously switched, this protection optical transmitter/receiver 22 is set to the operable condition even under normal operation, so that optical signals such as a frame signal and a control signal are continuously transmitted/received. Also, the optical signals are continuously present at least 3 pieces of each of the transmitting fibers and the receiving fibers.

In the optical crossconnect apparatus 1G shown in FIG. 7, for instance, the optical signal outputted from the protection optical transmitter/receiver 22 can be sent out to the transmitting optical fiber as a monitoring optical signal for monitoring an optical transmission path condition by way of the optical signal branching unit 31 and the optical signal inserting unit 25, which are provided in this optical crossconnect apparatus 1G.

In the example shown in FIG. 7, since the monitoring optical signal can be sent out to the arbitrary transmitting optical fiber without switching the optical switch unit 10, the switched optical transmission path and also the switched-back optical transmission path can be monitored.

Figure 8:
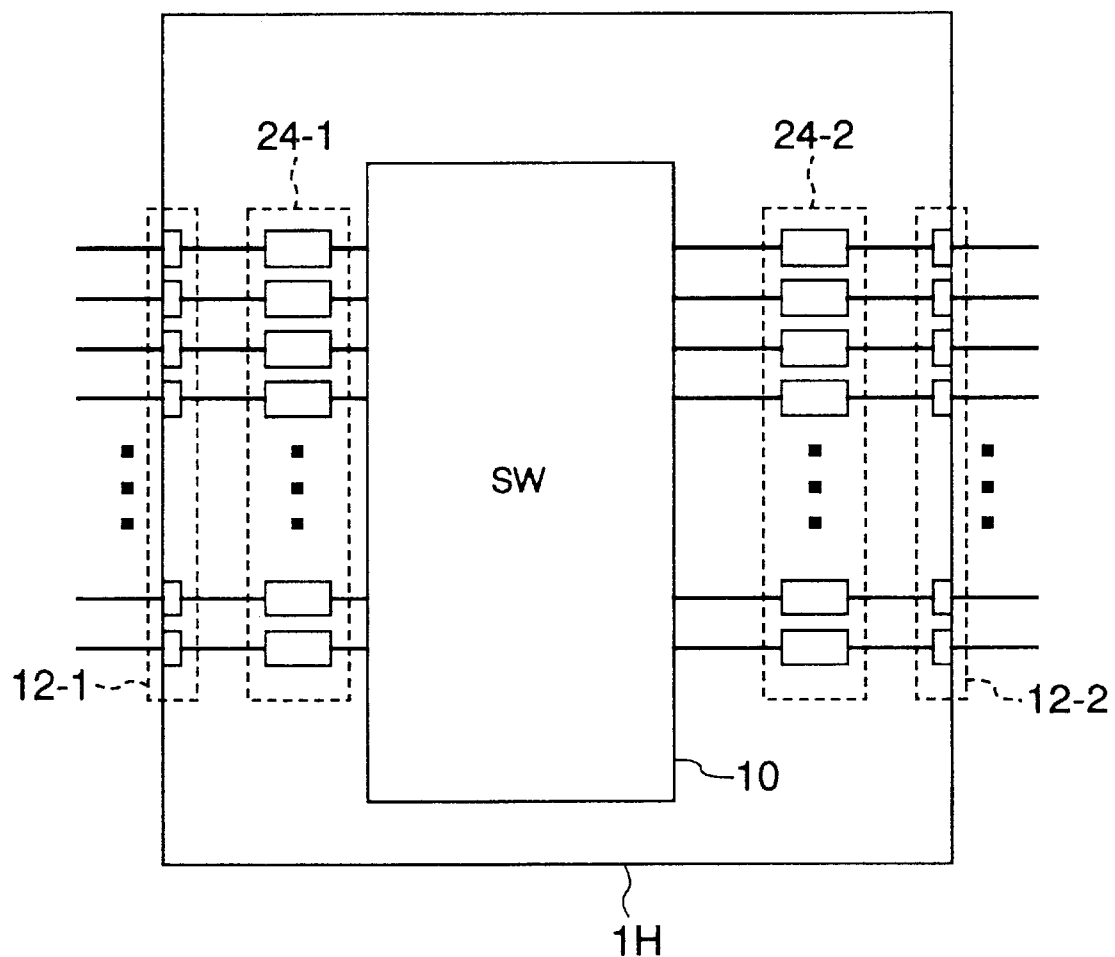
FIG. 8 is a schematic block diagram for indicating an optical crossconnect apparatus according to another embodiment of the present invention.

FIG. 8 is a schematic block diagram for representing a structural example of an optical crossconnect apparatus 1H according to another embodiment of the present invention. In FIG. 8, reference numerals 24-1 and 24-2 show optical transmission signal monitoring units, and other reference numerals indicate the same unit elements shown in FIG. 6.

The optical crossconnect apparatus 1H shown in FIG. 8 is arranged by an optical signal input unit 12-1; the optical signal monitoring unit 24-1 provided on an input side of this optical crossconnect apparatus; an optical switch unit 10; the optical transmission signal monitoring unit 24-2 provided on an output side thereof; and an optical signal input/output unit 12-2. Then, the optical transmission signal monitoring unit 24-1 is provided between the optical signal input/output unit 12-1 and the optical switch unit 10, whereas the optical transmission signal monitoring unit 24-2 is provided between the optical switch unit 10 and the optical signal input/output unit 12-2.

In accordance with the optical crossconnect apparatus 1H with employment of the above-described arrangement, for instance, the optical transmission signal monitoring unit 24-1 can monitor the condition of the optical transmission signal entered from the optical input/output unit 12-1 to the optical crossconnect apparatus 1H, whereas the optical transmission signal monitoring unit 24-2 can monitor the condition of the optical transmission signal whose optical path is switched by the optical switch unit, and which is outputted from the optical signal input/output unit 12-2. Also, since the output from the optical transmission signal monitoring unit 24-1 is compared with the output from the optical transmission signal monitoring unit 24-2, the failure of the optical switch unit 10 can be diagnosed.

It should also be noted that the optical transmission signal monitoring units 24-1 and 24-2 may be arranged by, for example, an 1-input/2-output photocoupler, and a photodetector. The optical transmission signal monitoring units may be arranged with a 2-input/2-output optical coupler and an optical detector. In this case, the optical crossconnect apparatus 1H can be operated in the bidirectional transmission.

Figure 9:
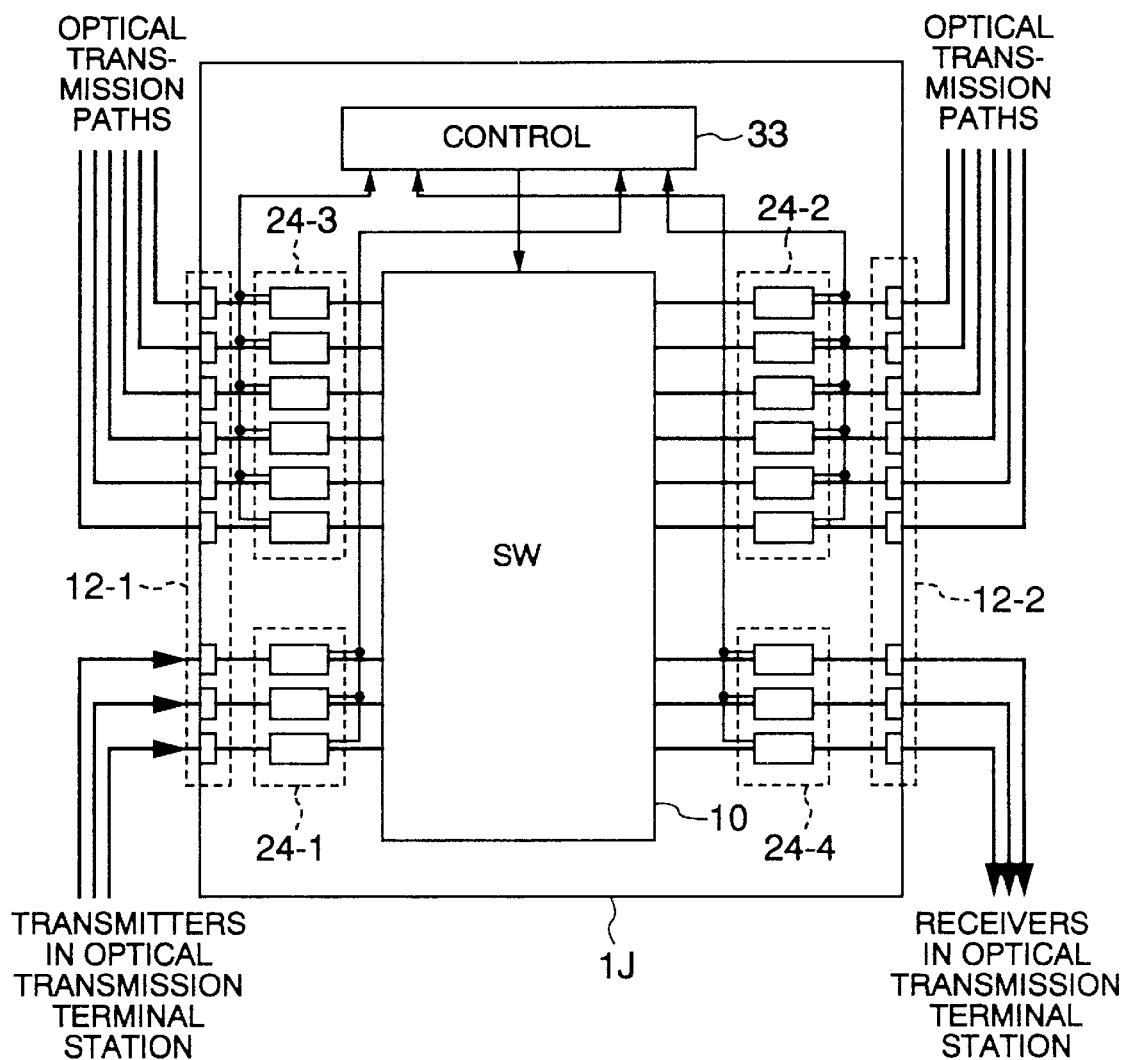
FIG. 9 is a schematic block diagram for showing an optical crossconnect apparatus according to another embodiment of the present invention.

FIG. 9 is a schematic block diagram for representing a structural example of an optical crossconnect apparatus 1J according to another embodiment of the present invention. In FIG. 9, reference numerals 24-3 and 24-4 show optical transmission signal monitoring units, reference numeral 33 indicates a control unit, and other reference numerals indicate the same unit elements shown in FIG. 6.

The optical crossconnect apparatus 1J shown in FIG. 9 is an example of such an optical crossconnect apparatus having a malfunction diagnosing function of the optical switch unit 10 by comparing outputs from the optical transmission signal monitoring units 24-1, 24-2, 24-3 and 24-4 with each other.

The optical crossconnect apparatus 1J is connected to 3 sets of optical transmitter/receiver of an optical transmission terminal station apparatus, 6 pieces of optical transmission paths on the output side, and 6 pieces of optical transmission paths on the input side. Then, the optical transmission signal monitoring unit 24-1 is provided between the optical signal input/output unit 12-1 and the optical switch unit 10, whereas the optical transmission signal monitoring unit 24-2 is provided between the optical switch unit 10 and the optical signal input/output unit 12-2. Also, the optical transmission signal monitoring unit 24-3 is provided between the optical signal input/output unit 12-1 and the optical switch unit 10, whereas the optical transmission signal monitoring unit 24-4 is provided between the optical switch unit 10 and the optical signal input/output unit 12-2. As previously described, this optical crossconnect apparatus 1J can be operated in the bidirectional transmission.

In accordance with the optical crossconnect apparatus 1J with employment of the above-described arrangement, for instance, the output from the optical signal monitoring unit 24-1 is compared with the output from the optical signal monitoring unit 24-2 by the control unit 33, and also the output from the optical signal monitoring unit 24-3 is compared with the output from the optical signal monitoring unit 24-4 by the control unit 33. Referring to the connection condition of the optical switch unit 10, which is saved by the control unit 33, or an external apparatus other than the optical crossconnect apparatus, the malfunction of the optical switch unit 10 capable of switching the optical signal paths can be detected and also can be diagnosed.

Figure 10:
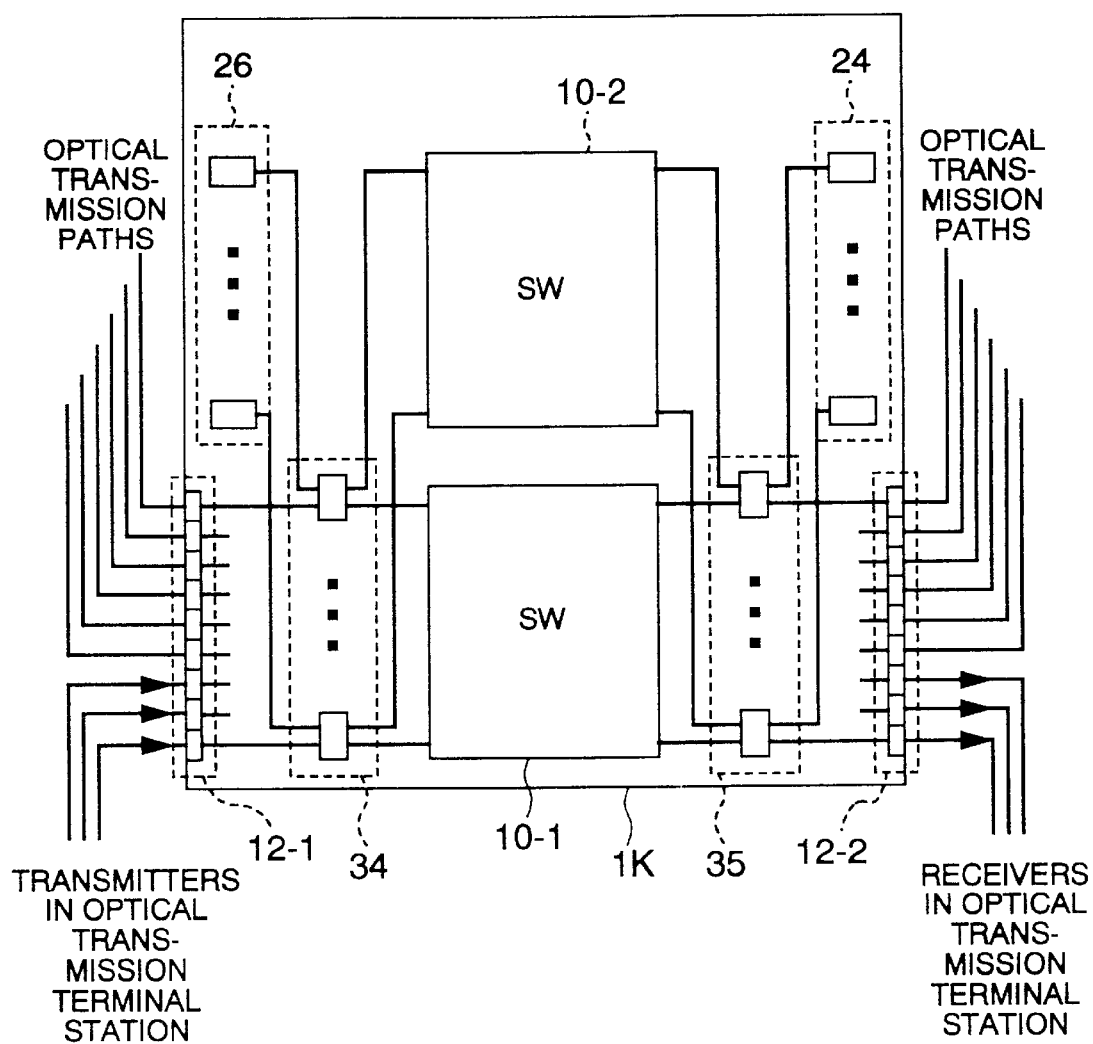
FIG. 10 is a schematic block diagram for representing an optical crossconnect apparatus according to another embodiment of the present invention.

FIG. 10 is a schematic block diagram for showing a structural example of an optical crossconnect apparatus 1K according to another embodiment of the present invention. In FIG. 10, reference numerals 10-1 and 10-2 indicate optical switch units; reference numeral 24 indicates optical transmission signal monitoring units; reference numeral 26 shows monitoring optical signal sources; reference numeral 34 represents an optical input signal switching unit; reference numeral 35 denotes an optical output signal switching unit; and other reference numerals show the same unit elements shown in FIG. 6.

The optical crossconnect apparatus 1K indicated in FIG. 10 is arranged by an optical signal input/output unit 12-1; the optical input signal switching unit 34; the monitoring optical signal source 26; the optical switch units 10-1 and 10-2; the optical output signal switching unit 35; the optical signal monitoring unit 24; an optical input/output unit 12-2; and also a control unit 33. Although this control unit 33 is not shown in this drawing, this control unit 33 is similar to that of FIG. 9. Both the optical input signal switching unit 34 and the optical output signal switching unit 35 may be arranged by, for instance, a plurality of 2-input/3output optical switches. As explained above, the optical crossconnect apparatus 1K can be operated in the bidirectional transmission.

Then, in order to achieve high reliability of the optical crossconnect apparatus 1K, this optical crossconnect apparatus 1K employs the working optical switch unit 10-1 and the protection optical switch unit 10-2 as to the malfunction of the optical switch unit. The optical input signal switching unit 34 is operated in association with the optical output signal switching unit 35, so that the optical switches through which the optical transmission signal passes can be switched.

In accordance with the above-described unit arrangement of the optical crossconnect apparatus 1K, for example, the optical signal of the monitoring optical signal source 26 is entered into the optical input signal switching 34, and the input of the optical signal monitoring unit 24 is connected to the optical output signal switching 35. As a consequence, for instance, while the working optical switch unit 10-1 switches the transmission path of the optical transmission signal, the monitoring optical signal derived from the monitoring optical signal source 26 can be transmitted via the protection optical switch unit 10-2 to the optical signal monitoring unit 24, and the optical signal monitoring unit 24 is employed so as to be capable of confirming that the protection optical switch unit 10-2 is operated under normal condition.

Furthermore, in such a case that the malfunction of the working optical switch unit is judged to switch this working optical switch unit into the protection optical switch unit 10-2, the place where this malfunction happens to occur can be identified by employing the monitoring optical signal derived from the monitoring optical signal source 26 and the optical signal monitoring unit 24.

Figure 11:
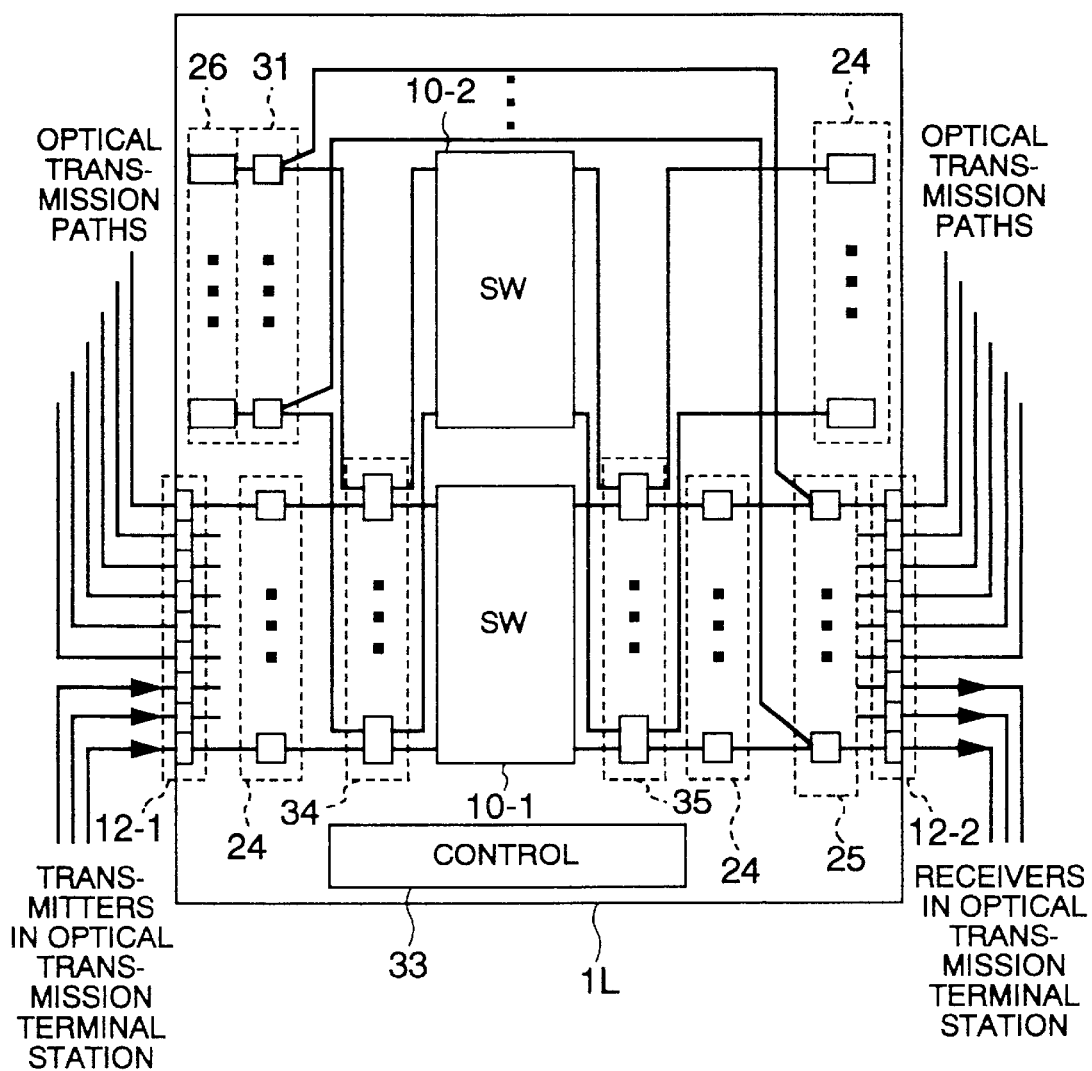
FIG. 11 is a schematic block diagram for indicating an optical crossconnect apparatus according to another embodiment of the present invention.

FIG. 11 is a schematic block for showing a structural example of an optical crossconnect apparatus 1L according to another embodiment of the present invention. Reference numerals shown in FIG. 11 are the same as those for denoting the same unit elements of other embodiments.

The optical crossconnect apparatus 1L indicated in FIG. 11 is arranged as follows. That is, with respect to the optical crossconnect apparatus 1L indicated in FIG. 10, an optical signal monitoring unit 24 is provided at a post stage of an optical signal input/output unit 12-1, and also another optical signal monitoring unit 24 is provided at a post stage of an optical output signal switching 35. Further, an optical signal branching unit 31 for branching the monitoring optical signal derived from the monitoring optical signal source 26 is provided at a post stage of the monitoring optical signal source 26, and a monitoring optical signal inserting unit 25 is provided at a prestage of an optical signal input/output unit 12-2. As previously explained, this optical crossconnect apparatus 1L can be operated in the bidirectional transmission.

In the optical crossconnect apparatus 1L shown in FIG. 11, the control unit 33 compares the output signals with each other, which are outputted from two sets of the optical signal monitoring units 24 provided on both sides of the working optical switch unit 10-1, so that this control unit 33 monitors whether or not the malfunction occurs in the optical switch unit 10-1. Also, the optical signal monitoring unit 24 connected to the post stage of the optical output signal switching 35 monitors the monitoring optical signal which has passed through the protection optical switch unit 10-2. As an consequence, this optical signal monitoring unit 24 can confirm that the protection optical switch 10-2 is operated under normal condition.

When the control unit 33 diagnoses the occurrence of the failure in the working optical switch unit 10-1, this control unit 33 causes the optical input signal switching 34 to be associated with the optical output signal switching 35, so that the optical transmission signal is switched to be supplied to the protection optical switch unit 10-2. At this time, the control unit 33 controls the protection optical switch unit 10-2 in such a manner that the transmission path of the optical transmission signal can be correctly switched. Furthermore, the control unit 33 can identify the failure occurrence position by connecting the monitoring optical signal source 26, the optical signal monitoring unit 24, and the optical switch unit 10-1, the failure of which is diagnosed, with each other.

For example, when a failure happens to occur in the optical transmission path on the output side of the optical crossconnect apparatus 1L shown in FIG. 11, this optical crossconnect apparatus 1L sends out the monitoring optical signal branched by the optical signal branching unit 31 via the optical signal inserting unit 25 to such an optical transmission path where the failure happens to occur. As a result, another optical crossconnect apparatus related to this failure of the optical transmission path monitors this monitoring optical signal by the optical signal monitoring unit, so that this optical crossconnect apparatus can quickly confirm that the optical transmission path where the failure occurs is restored. As a consequence, rapid restoration to the normal condition can be realized.

It should be understood that as the optical switch unit described in the respective embodiments, an optical mechanical optical switch or polymer optical switch may be employed, and also the optical amplifier may be employed an optical fiber amplifier, a semiconductor optical amplifier, and a regenerator as optical amplifier.

Figure 12A:
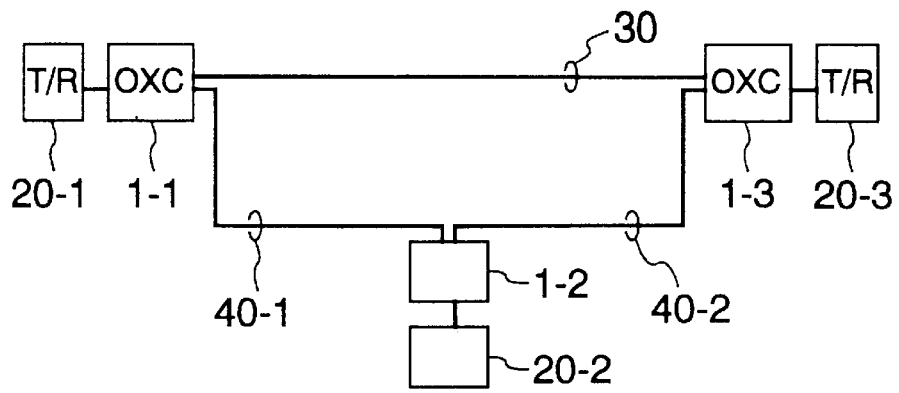
FIG. 12A and FIG. 12B are system structural diagrams for schematically representing an optical transmission system according to an embodiment of the present invention.
Figure 12B:
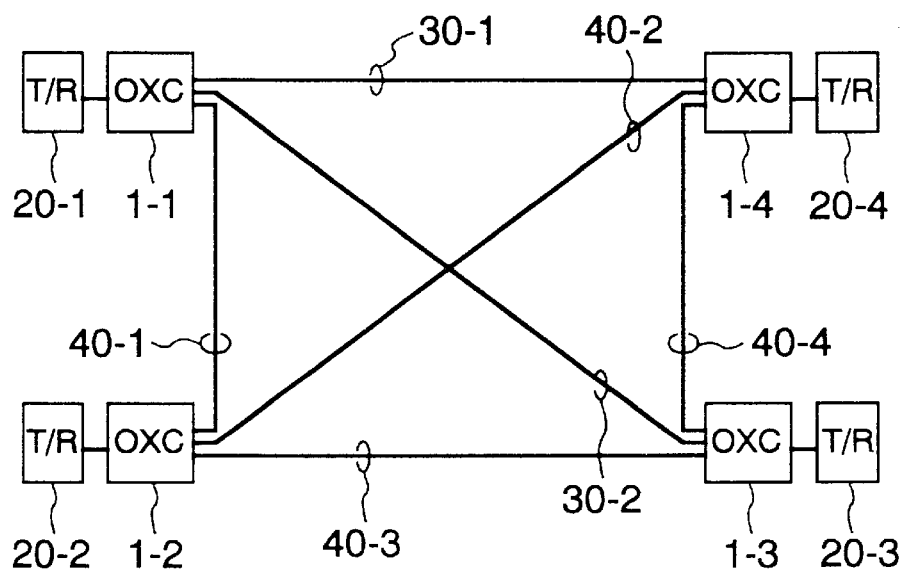

Referring now to FIG. 12A and FIG. 12B, an optical transmission system with employment of the optical crossconnect apparatus, according to an embodiment of the present invention will be described. FIG. 12A schematically shows an optical transmission system which is arranged by the optical crossconnect apparatuses 1-1 to 1-3 of the present invention as previously described; optical transmitters/receivers 20-1 to 20-3; a working optical fiber 30; and protection optical fibers 40-1 to 40-2.

In this optical transmission system, in order that a basic operation to restore a failure, or trouble occurred in a transmission path of the optical transmission system is simply explained, a connection relationship among the respective optical crossconnect apparatuses is indicated by a single optical fiber bundle. Two sets of the optical transmitters/receivers 20-1 and 20-3 are connected to each other via the respective optical crossconnect apparatuses 1-1 and 1-3 by using the working optical fiber 30. At the same time, these two optical transmitters/receivers 20-1 and 20-3 are connected to each other via the protection optical fiber 40-1, the optical crossconnect apparatus 1-2, and the protection optical fiber 40-2.

In the case that both the optical crossconnect apparatuses 1-1 and 1-3 detect an occurrence of a failure in the working optical fiber 30, an optical signal which is transmitted through this working optical fiber 30 is switched to the protection optical fibers 40-1 and 40-2. In the optical crossconnect apparatus 1-2, the protection optical fiber 40-1 can be mutually connected to the protection optical fiber 40-2.

In accordance with the present invention, since optical signal repeaters built in the optical crossconnect apparatuses 1-1 to 1-3 are connected to each other via the protection optical fibers and the optical switch units, even in such a case that a failure happens to occur in one protection optical fiber and furthermore the signal path is switched to another protection optical fiber, there is no need to provide the optical signal repeater with respect to each of these protection optical fibers. Also, even when a failure happens to occur in one optical signal repeater built in one optical crossconnect apparatus, since this troubled optical signal repeater can be quickly switched to another optical signal repeater whose operation reliability is confirmed, the protection optical fibers can be effectively utilized.

For the sake of simple explanations, as is apparent from the drawing, the following optical fibers are omitted; namely the protection optical fiber connected between the optical crossconnect apparatus 1-1 and the optical crossconnect apparatus 1-3, the working optical fiber connected between the optical crossconnect apparatus 1-1 and the optical crossconnect apparatus 1-2, and the working optical fiber connected between the optical crossconnect apparatus 1-2 and the optical crossconnect apparatus 1-3.

FIG. 12B schematically indicates an optical transmission system, according to another embodiment of the present invention, with employment of the optical crossconnect apparatus according to the present invention. In this embodiment, the optical transmission system is constituted by 4 nodes in a mesh form. In this optical transmission system, the following case will now be considered. That is, an optical signal is transmitted from the optical transmitter/receiver 20-1 to the optical transmitter/receiver 20-4. During the normal transmission operation, this optical signal is transmitted via the working optical fiber 30-1. When a failure happens to occur in this working optical fiber 30-1, for example, the protection optical fiber 40-1 is selected to switch the signal transmission path in the optical crossconnect apparatus 1-1, whereas, for instance, the protection optical fiber 40-2 is selected to switch the signal transmission path in the optical crossconnect apparatus 1-4. Furthermore, in the optical crossconnect apparatus 1-2, the protection optical fiber 40-1 is mutually connected to the protection optical fiber 40-2 via the optical signal repeater and optical switch units. At this time, a transmission direction of the optical signal is directed from the protection optical fiber 40-1 to the protection optical fiber 40-2.

In this optical transmission system, another case will now be considered. That is, an optical signal is transmitted from the optical transmitter/receiver 20-3 to the optical transmitter/receiver 20-1. During the normal transmission operation, this optical signal is transmitted via the working optical fiber 30-2. When a failure happens to occur in this working optical fiber 30-2 and the protection optical fiber 40-3, for example, the protection optical fiber 40-4 is selected to switch the signal transmission path in the optical crossconnect apparatus 1-3, whereas, for instance, the protection optical fiber 40-2 is selected to switch the signal transmission path in the optical crossconnect apparatus 1-4. Furthermore, in the optical crossconnect apparatus 1-2, for example, the protection optical fiber 40-1 is selected to switch the signal transmission path. At this time, in the optical crossconnect apparatus 1-2, the protection optical fiber 40-1 is mutually connected to the protection optical fiber 40-2 via the optical signal repeater. At this time, a transmission direction of the optical signal is directed from the protection optical fiber 40-2 to the protection optical fiber 40-1.

Since the optical crossconnect apparatuses 1-1 to 1-4 according to the present invention are employed, as previously explained, the route can be freely set with high flexibility when the troubled transmission path is recovered, and also the protection optical fibers can be effectively utilized.

As apparent from the drawing, for the sake of simple explanation, the protection optical fibers and the working optical fibers are properly omitted.

Figure 13:
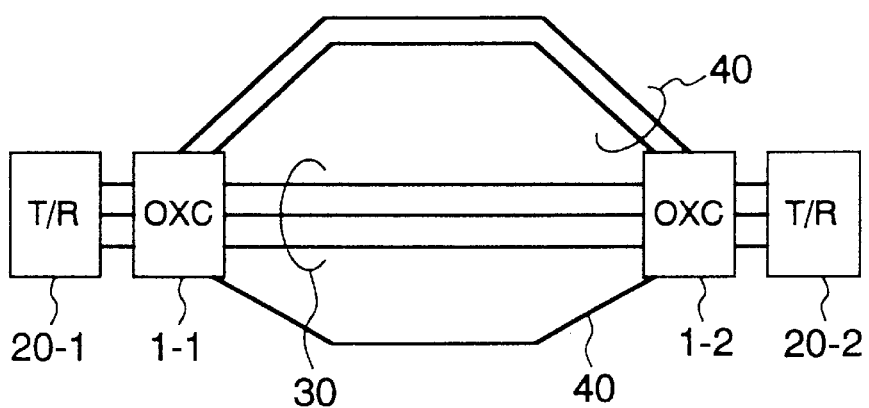
FIG. 13 is a system structural diagram for schematically indicating an optical transmission system according to another embodiment of the present invention.

FIG. 13 is a schematic block diagram for indicating another arrangement of an optical transmission system arranged by employing the optical crossconnect apparatus. In FIG. 13, reference numerals 20-1 and 20-2 denote optical transmitters/receivers, reference numeral 30 represents a working optical fiber, and reference numeral 40 shows an protection optical fiber.

The optical transmission system indicated in FIG. 13 is arranged by that a plurality of working optical fibers 30 and a plurality of protection optical fibers 40 are employed so as to mutually connect two sets of the optical crossconnect apparatuses 1-1 and 1-2 for connecting the optical transmitters/receivers 20-1 and 20-2. As the optical crossconnect apparatuses 1-1 and 1-2, the optical crossconnect apparatus according to the respective embodiments of the present invention, as described above, may be used.

In the above-described optical transmission system, the conditions of the optical transmission paths can be monitored within the optical crossconnect apparatus. As a consequence, the normality of the switched-destination of the optical transmission path, or of the switched-back optical transmission path, and also of the optical switch unit employed in the optical crossconnect apparatus can be confirmed. The failure restoration can be confirmed. Therefore, the reliability of this optical transmission system can be improved.

It should be noted that although the optical transmission system shown in FIG. 13 is arranged by employing two sets of the optical crossconnect apparatuses 1-1 and 1-2, the present invention may be accomplished by constituting such a network. That is, a large number of optical crossconnect apparatuses and a large quantity of optical transmitters/receivers are employed, and then the optical transmission paths by the optical fibers (involving working optical fibers and protection optical fibers) are used to mutually connect the respective crossconnect apparatuses in the mesh network, or the ring network, in order to establish such a network.

What is claimed is:

1. An optical crossconnect apparatus having one terminal connected to a transmission path from one optical transmission terminal station and an other terminal connected to a transmission path from another optical transmission terminal station, and capable of switching said transmission paths when an optical signal is transmitted between the one optical transmission terminal station and the other optical transmission terminal station, comprising:

a first optical signal switching means having "M1 (M1 being an integer larger than, or equal to 2)" number of ports and "N1 (N1 being an integer larger than, or equal to 1)" number of ports, through which optical signals in a predetermined range of wavelength can pass;

a second optical signal switching means having "M2 (M2 being larger than, or equal to 2)" number of ports and "N2 (N2 being an integer larger than, or equal to 1)" number of ports, through which the optical signals in a predetermined range of wavelength can pass; and "L (L being an integer larger than, or equal to 1)" number of optical signal repeaters, one end of which is connected to the "N1" number of ports of said first optical signal switching means, and the other end of which is connected to the "N2" number of ports of said second optical switching means, wherein said "N1" number of ports and said "N2" number of ports are larger than said "L" number of the optical signal repeaters, and wherein said "M1" number of ports of said first optical signal switching means connected to said one terminal, and said "M2" number of ports of said second optical signal switching means connected to said the other terminal are larger than, or equal to 2.

2. An optical crossconnect apparatus having one terminal connected to a transmission path from one optical transmission terminal station and an other terminal connected to a transmission path from another optical transmission terminal station, and capable of switching said transmission paths when an optical signal is transmitted between the one optical transmission terminal station to the other optical transmission terminal station, comprising:

a first optical signal switching means having "M1 (M1 being an integer larger than, or equal to 1)" number of ports and "N1 (N1 being an integer larger than, or equal to 2,)" number of ports, through which optical signals in a predetermined range of wavelength can pass;

a second optical signal switching means having "M2 (M2 being larger than, or equal to 1)" number of ports and "N2 (N2 being an integer larger than, or equal to 2)" number of ports, through which the optical signals in a predetermined range of wavelength can pass; and "L (L being an integer larger than, or equal to 1)" number of optical signal repeating means, one end of which is connected to the "N1" number of ports of said first optical signal switching means, and the other end of which is connected to the "N2" number of ports of said second optical switching means, wherein said "N1" number of ports and said "N2" number of ports are larger than said "L" number of optical signal repeaters, and wherein said "M1" number of ports of said first optical signal switching means connected to said one terminal, and said "M2" number of ports of said second optical signal switching means connected to said the other terminal are larger than, or equal to 1.

3. An optical crossconnect apparatus having one terminal connected to a transmission path from one optical transmission terminal station and an other terminal connected to a transmission path from another optical transmission terminal station, and capable of switching said transmission paths when an optical signal is transmitted between the one optical transmission terminal station and the other optical transmission terminal station, comprising:

a first optical signal switching means having "M (M being an integer larger than, or equal to 1)" number of ports and "2×M" number of ports, through which optical signals in a predetermined range of wavelength can pass;

"L (L being an integer larger than, or equal to 1)" number of optical signal repeaters; and a second optical signal switching means having "N1 (N1 being larger than, or equal to 2L+M)" number of ports and also "N2 (N2 being larger than, or equal to 1)" number of ports, wherein M number of ports among the (2×M) ports of said first optical signal switching means, and (2×L) number of ports of said L number of optical signal repeaters are connected to the N1 number of ports of said second optical switching means.

4. An optical crossconnect apparatus as claimed in claim 3 wherein said first optical signal switching means "M" number of 1-input/2-output optical switch means and wherein each of said optical switch means includes two ports connected to said one terminal of the optical crossconnect apparatus, and one port connected to any of the N1 number of ports and the N2 number of ports of said second optical signal switching means.

5. An optical crossconnect apparatus as claimed in claim 3 wherein said first optical signal switching means includes a mechanical optical switch, and wherein each of said mechanical optical switch two ports connected to said one terminal of the optical crossconnect apparatus, and one port connected to any of the N1 number of ports and the N2 number of ports of said second optical signal switching means.

6. An optical crossconnect apparatus as claimed in claim 3 wherein said optical signal repeater is an optical fiber amplifier.

7. An optical crossconnect apparatus as claimed in claim 3 wherein said optical signal repeater is a semiconductor optical amplifier.

8. An optical crossconnect apparatus as claimed in claim 3 wherein said optical signal repeater is a regenerator.

* * * * *